United States Patent Office 3,646,229
Patented Feb. 29, 1972

3,646,229
USE OF DIMETHOXYMETHANE TO INHIBIT A METHYLENE CHLORIDE-ALUMINUM REACTION
Wesley L. Archer, Midland, and Elbert L. Simpson, Auburn, Mich., assignors to The Dow Chemical Company, Midland, Mich.
No Drawing. Continuation of application Ser. No. 775,182, Nov. 12, 1968. This application July 13, 1970, Ser. No. 56,210
Int. Cl. C07c 17/40, 17/42
U.S. Cl. 260—652.5 R    5 Claims

ABSTRACT OF THE DISCLOSURE

Methylene chloride containing from 0.03 to 10.0 weight percent of a compound having the formula:

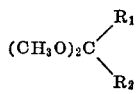

wherein $R_1$ may be hydrogen and $R_2$ may be hydrogen or a methyl radical, and wherein $R_1$ and $R_2$ may be taken together and represent oxygen. The composition is stable in combination with an aromatic hydrocarbon such as toluene, xylene or naphthalenes, when used in combination with aluminum to prepare paints and lacquers.

---

This application is a continuation of our copending application Ser. No. 775,182, filed Nov. 12, 1968 and now abandoned.

BACKGROUND OF INVENTION

Methylene chloride is a low boiling chlorinated hydrocarbon, 40° C., which has excellent solvent properties. Methylene chloride has been used as a solvent in combination with the aromatic hydrocarbons such as toluene, xylene and the naphthalenes for preparing aluminized paints with little trouble. However, on occasion the solvent has degraded in storage. On several of these occasions, the degradation was rapid and even explosive. The degradation has been attributed, at least in part, to the combination of the methylene chloride-toluene mixture coming into contact with aluminum chloride and/or iron chloride which has been produced in situ from reaction of the methylene chloride and/or small quantities of the chlorinated impurities remaining in the methylene chloride from its production, with aluminum. It has been found that as little as 0.01 mole of aluminum chloride or iron chloride per liter of methylene chloride-aromatic hydrocarbon will initiate a reaction between the methylene chloride and aluminum in about one-half hour.

BRIEF DESCRIPTION OF INVENTION

The present invention comprises a composition of matter consisting essentially of methylene chloride and from 0.03 to 10 weight percent, based on the methylene chloride, of a compound having the formula:

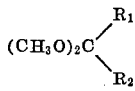

wherein $R_1$ may be hydrogen, $R_2$ may be hydrogen or methyl and $R_1$ and $R_2$ may be taken together and represent oxygen. Thus, one may employ dimethoxymethane, 1,1-dimethoxyethane or dimethyl ester of carbonic acid.

The foregoing composition is inhibited from reaction with aluminum, aluminum chloride and/or iron chloride alone or when in combination with from 10 to 70 volume percent of an aromatic hydrocarbon which will form with the aluminum chloride and/or iron chloride a loose complex in the nature of a Friedel-Crafts catalyst.

It has been found that as little as 0.03 weight percent of one of the above-named methoxy or methyl ester compounds will inhibit the reaction between methylene chloride and aluminum even when an aromatic compound, say, toluene is present.

It is further to be understood that other inhibitors known to the art for preventing the oxidative degradation, the hydrolysis, the degradation from heat and light may be added if the methylene chloride is to be subjected to such conditions. The presence of these additional stabilizers does not affect the stabilizing effect of the compounds of the present invention.

The aromatic compounds which are employed by the paint industry, particularly the aluminum paint industry, are toluene, xylene and the naphthalenes. Other aromatics such as benzene, although not commonly employed, can also be used with the composition of the present invention.

DETAILED DESCRIPTION OF INVENTION

The invention here disclosed is based upon the discovery that methylene chloride or methylene chloride-aromatic hydrocarbon mixtures can be stabilized against degradation in the presence of aluminum and either or both aluminum chloride or iron chloride. It is relatively well known that neither methylene chloride nor aromatic hydrocarbons are particularly reactive with aluminum. However, methylene chloride will react with aluminum in one and one-half hours if a small quantity of aluminum chloride is present. Further, the reaction can be initiated three times as fast if 10% by volume of an aromatic hydrocarbon is also present. A series of tests were run to illustrate these phenomena. Methylene chloride, uninhibited, was refluxed with aluminum and/or aluminum chloride for seventy-two hours or until reaction was evident as indicated by a reddish coloration in the liquid. The results of these several tests are set forth below.

| Methylene chloride, vol. percent | Toluene, mole/l. | Al, 108 gms./l. | AlCl₃, 0.01 mole/l. | Time in hours to first visual evidence of red color |
|---|---|---|---|---|
| 100 | — | X | — | None in 72. |
| 100 | — | X | X | 1.5. |
| 90 | 10 | X | — | None in 72. |
| 90 | 10 | X | X | 0.5–3. |
| 80 | 20 | X | X | 0.5. |
| 50 | 50 | X | X | 0.5. |

To further illustrate the problems encountered when iron chloride was present, a series of tests were run wherein iron powder was added to 50 milliliters of a solution of 90% by volume of methylene chloride, 10% by volume toluene which also contained 0.5 gram of aluminum. The presence of 0.1 gram of iron powder initiated a reaction in about 1 day. The presence of 0.25 gram of iron powder initiated the reaction in less than 1 day.

EXAMPLE 1

A solution of 90 volume percent methylene chloride and 10 volume percent toluene containing 0.5 gram of aluminum powder and 0.01 mole per liter of AlCl₃ was employed as a base solution for the following tests. To an aliquot was added various amounts of one of the compounds of the present invention and the so-prepared mixture was heated at reflux for 72 hours. A control with no compound of the present invention added was also subjected to reflux and a red coloration was visible after 0.5 hour. The following table sets forth the results observed.

| Inhibitor | Moles/ liter | Weight percent | Remarks |
|---|---|---|---|
| Dimethoxymethane, $(CH_3O)_2CH_2$. | 0.005 | 0.0286 | Water white. |
| 1,1-dimethoxyethane, $(CH_3O)_2CH.CH_2$. | 0.017 | 0.115 | Do. |
| Dimethyl ester of carbonic acid, $(CH_3O)_2C=O$. | 0.01 | 0.065 | Do. |
| Control | | | Red coloration visible after 0.5 hours—with strong color and strong evolution of HCl in less than 3 hours. |

To illustrate the unique character of the compounds of the present invention, a series of experiments were made in the same manner above set forth employing closely related compounds to those of the present invention. The results are set forth below.

| Inhibitor, $(CH_3O)_2CR_1R_2$ | Minimum concentration to prevent reaction in 72 hours | |
|---|---|---|
| | Mole/liter | Weight percent* |
| 2,2-dimethoxypropane, $(CH_3O)_2C(CH_3)_2$ | 0.80 | 5.5 |
| 1,2-dimethoxyethane, $(CH_3O)-CH_2$ $(CH_3O)-CH_2$ | 0.06 | 0.408 |
| 1,1,1-trimethoxyethane, $(CH_3O)_3CCH_3$ | 0.05 | 0.362 |
| Trimethoxymethane, $(CH_3O)_3CH$ | 0.05 | 0.307 |
| 1,3-dimethyl ester of dipropionic acid, $CH_3OC=O$ $CH_2$ $CH_3OC=O$ | 0.04 | 0.368 |

*Weight percent calculated as follows:

$$\text{Weight percent} = \frac{\text{(Mole inhibitor per liter)(inhibitor molecular weight)}}{13.32}$$

EXAMPLE 2

In another experiment similar to that described in Example 1, a solution containing 90 volume percent methylene chloride and 10 volume percent toluene containing 0.5 gram of aluminum powder and 0.01 mole per liter of $AlCl_3$ and to which 0.01 mole per liter of dimethoxymethane had been added was refluxed for 14 days without any discoloration or evidence of HCl evolution.

We claim:

1. A stabilized composition comprising methylene chloride, a stabilizing amount, 0.03 to 10 weight percent based on said methylene chloride, of an inhibitor selected from the group consisting of dimethoxymethane, 1,1-dimethoxyethane and dimethyl ester of carbonic acid, a liquid aromatic hydrocarbon which will form with $AlCl_3$ a loose complex in the nature of a Friedel-Crafts catalyst, aluminum and aluminum chloride which has been produced in situ from the reaction of aluminum with (1) methylene chloride and/or (2) small quantities of chlorinated impurities remaining in the methylene chloride from its production.

2. The composition of claim 1 wherein said inhibitor is dimethoxymethane.

3. The composition of claim 1 wherein said inhibitor is 1,1-dimethoxyethane.

4. The composition of claim 1 wherein said inhibitor is dimethyl ester of carbonic acid.

5. The composition of claim 1 wheerin said hydrocarbon liquid is toluene.

References Cited

UNITED STATES PATENTS

| 1,566,819 | 12/1925 | Carter. |
| 2,043,260 | 6/1936 | Missbach. |
| 2,094,367 | 9/1937 | Missbach. |
| 2,310,971 | 2/1943 | Lincoln et al. |
| 2,371,647 | 3/1945 | Petering et al. |
| 2,781,406 | 2/1957 | Dial. |
| 3,128,315 | 10/1964 | Hardies. |
| 3,281,480 | 10/1966 | Hardies. |
| 3,326,988 | 6/1967 | Stack. |

FOREIGN PATENTS

| 1,120,139 | 7/1908 | Great Britain. |

HOWARD T. MARS, Primary Examiner

U.S. Cl. X.R.

252—170, 407

PO-1050
(5/69)

UNITED STATES PATENT OFFICE
CERTIFICATE OF CORRECTION

Patent No. 3,646,229      Dated 29 Feb. 1972

Inventor(s) Wesley L. Archer and Elbert L. Simpson

It is certified that error appears in the above-identified patent and that said Letters Patent are hereby corrected as shown below:

Column 2, the table between lines 43 and 52, change the heading in the second column from "Toluene, mole/l." to --Toluene, Vol. %--.

Column 3, line 36, change the 5th number in the last column of the table from "0.368" to --0.398--.

Column 4, line 25, delete "wheerin" to --wherein--.

Signed and sealed this 25th day of July 1972.

(SEAL)
Attest:

EDWARD M. FLETCHER, JR.
Attesting Officer

ROBERT GOTTSCHALK
Commissioner of Patents